(12) United States Patent
Yokoyama

(10) Patent No.: US 12,240,429 B2
(45) Date of Patent: Mar. 4, 2025

(54) BRAKE STATE ESTIMATION DEVICE AND VEHICLE EQUIPPED THEREWITH, BRAKE STATE ESTIMATING METHOD, AND RECORDING MEDIUM STORING PROGRAM

(71) Applicant: TOYOTA JIDOSHA KABUSHIKI KAISHA, Toyota (JP)

(72) Inventor: Tomohiro Yokoyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 248 days.

(21) Appl. No.: 17/954,673

(22) Filed: Sep. 28, 2022

(65) Prior Publication Data

US 2023/0140171 A1    May 4, 2023

(30) Foreign Application Priority Data

Oct. 28, 2021   (JP) ................. 2021-176664

(51) Int. Cl.
*B60T 17/22*    (2006.01)
*F16D 66/00*    (2006.01)

(52) U.S. Cl.
CPC ........... *B60T 17/22* (2013.01); *B60T 2210/30* (2013.01); *F16D 2066/001* (2013.01); *F16D 2066/006* (2013.01)

(58) Field of Classification Search
CPC ................. B60T 17/22; B60T 2210/30; F16D 2066/001; F16D 2066/006
See application file for complete search history.

(56) References Cited

U.S. PATENT DOCUMENTS

| | | | |
|---|---|---|---|
| 2014/0025271 A1* | 1/2014 | Fahland | B60L 7/12 701/70 |
| 2018/0312154 A1* | 11/2018 | Yen | B60T 17/221 |
| 2020/0001851 A1* | 1/2020 | Peinert | B60T 17/221 |

FOREIGN PATENT DOCUMENTS

| | | |
|---|---|---|
| JP | 2019-119401 A | 7/2019 |
| JP | 2021-060096 A | 4/2021 |

* cited by examiner

*Primary Examiner* — James J Lee
*Assistant Examiner* — Steven Vu Nguyen
(74) *Attorney, Agent, or Firm* — Sughrue Mion, PLLC

(57) ABSTRACT

A brake state estimation device includes: a position acquisition section that acquires a position of a subject vehicle; and a state estimation section that estimates a state of deterioration of brake fluid for operating a hydraulic brake device of the subject vehicle, on the basis of humidity information corresponding to the position of the subject vehicle, and duration information expressing a duration of staying in an area that includes the position of the subject vehicle.

7 Claims, 11 Drawing Sheets

BRAKE STATE ESTIMATION DEVICE AND VEHICLE EQUIPPED THEREWITH, BRAKE STATE ESTIMATING METHOD, AND RECORDING MEDIUM STORING PROGRAM

CROSS-REFERENCE TO RELATED APPLICATION

This application is based on and claims priority under 35 USC 119 from Japanese Patent Application No. 2021-176664 filed on Oct. 28, 2021, the disclosure of which is incorporated by reference herein.

BACKGROUND

Technical Field

The present disclosure relates to a brake state estimation device and a vehicle equipped therewith, and to a brake state estimating method and a program.

Related Art

Japanese Patent Application Laid-Open (JP-A) No. 2019-119401 discloses a brake device monitoring system having a sensor that is built into a banjo bolt used at the time of connecting the brake hose to the brake caliper, and notifying means for notifying the driver of a parameter expressing the state of the brake fluid which parameter is generated on the basis of a sensor signal sensed by the sensor.

In the technique disclosed in JP-A No. 2019-119401, the sensor must be mounted separately in order to detect the state of the brake fluid.

SUMMARY

In view of the above-described circumstances, an object of the present disclosure is to estimate the state of deterioration of brake fluid by a simple structure.

A first aspect is a brake state estimation device including: a position acquisition section that acquires a position of a subject vehicle; and a state estimation section that estimates a state of deterioration of brake fluid for operating a hydraulic brake device of the subject vehicle, on the basis of humidity information corresponding to a position of the subject vehicle, and of duration information expressing a duration of stay in an area that includes the position of the subject vehicle.

In the brake state estimation device of the first aspect, the position acquisition section acquires the position of the subject vehicle. Further, the state estimation section estimates the state of deterioration of brake fluid for operating the hydraulic brake device of the subject vehicle, on the basis of humidity information corresponding to the position of the subject vehicle, and duration information expressing the duration of staying in an area that includes the position of the subject vehicle. Here, "humidity information" is information relating to the humidity at the position of the subject vehicle, and means information relating to the amount of moisture contained in the brake fluid of the subject vehicle. Further, "state of deterioration of the brake fluid" means the state relating to the occurrence of vapor lock of the brake fluid. In accordance with this brake state estimation device, the state of deterioration of the brake fluid can be estimated by a simple structure.

A brake state estimation device of a second aspect further includes, in the brake state estimation device of the first aspect, a temperature acquisition section that acquires a temperature of the brake device, wherein the state estimation section estimates the state of deterioration of the brake fluid on the basis of the temperature of the brake device, the humidity information, and the duration information.

The brake state estimation device of the second aspect further acquires the temperature of the brake device, and estimates the state of deterioration of the brake fluid on the basis of the temperature of the brake device, the humidity information, and the duration information. In accordance with this brake state estimation device, the state of deterioration of the brake fluid can be estimated accurately.

In a brake state estimation device of a third aspect, in the brake state estimation device of the second aspect, the state estimation section estimates a state of moisture contained in the brake fluid on the basis of the humidity information and the duration information, estimates a heat state of the brake fluid on the basis of the temperature of the brake device, and estimates the state of deterioration of the brake fluid on the basis of the moisture state and the heat state.

The brake state estimation device of the third aspect estimates the state of moisture contained in the brake fluid on the basis of the humidity information and the duration information, and estimates the heat state of the brake fluid on the basis of the temperature of the brake device, and estimates the state of deterioration of the brake fluid on the basis of the moisture state and the heat state. In accordance with this brake state estimation device, the state of deterioration of the brake fluid can be estimated accurately while taking the moisture state and the heat state of the brake fluid into consideration.

In a brake state estimation device of a fourth aspect, in the brake state estimation device of the second aspect, the state estimation section estimates the state of deterioration by using a learned model for estimating the state of deterioration of the brake fluid on the basis of the temperature of the brake device, the humidity information and the duration information.

In the brake state estimation device of the fourth aspect, the state of deterioration is estimated by using a learned model for estimating the state of deterioration of the brake fluid on the basis of the temperature of the brake device, the humidity information and the duration information. In accordance with this brake state estimation device, the state of deterioration of the brake fluid can be estimated accurately.

A vehicle of a fifth aspect includes: the brake state estimation device of any of the first through fourth aspects; and a hydraulic brake device.

The vehicle of the fifth aspect has the hydraulic brake device, and estimates the state of deterioration of the brake fluid of the hydraulic brake device. In accordance with this vehicle, the state of deterioration of the brake fluid can be estimated by a simple structure.

A brake state estimation method of a sixth aspect includes: acquiring, by a position acquisition section, a position of a subject vehicle; and estimating, by a state estimation section, a state of deterioration of brake fluid for operating a hydraulic brake device of the subject vehicle, on the basis of humidity information corresponding to a position of the subject vehicle, and of duration information expressing a duration of stay in an area that includes the position of the subject vehicle.

The sixth aspect is a brake state estimating method in which the position acquisition section acquires the position of a subject vehicle, and the state estimation section estimates the state of deterioration of brake fluid for operating the hydraulic brake device of the subject vehicle, on the basis of humidity information corresponding to the position of the subject vehicle, and duration information expressing the duration of staying in an area that includes the position of the subject vehicle. In accordance with this brake state estimating method, the state of deterioration of the brake fluid can be estimated by a simple structure.

A seventh aspect is a non-transitory recording medium storing a program for causing a computer to execute: acquiring a position of a subject vehicle; and estimating a state of deterioration of brake fluid for operating a hydraulic brake device of the subject vehicle, on the basis of humidity information corresponding to a position of the subject vehicle, and of duration information expressing a duration of stay in an area that includes the position of the subject vehicle.

In the program that is recorded on a non-transitory recording medium of the seventh aspect, the computer acquires the position of a subject vehicle. Further, the computer estimates the state of deterioration of brake fluid for operating the hydraulic brake device of the subject vehicle, on the basis of humidity information corresponding to the position of the subject vehicle, and duration information expressing the duration of staying in an area that includes the position of the subject vehicle. In accordance with this program, the state of deterioration of the brake fluid can be estimated by a simple structure.

In accordance with the present disclosure, the state of deterioration of brake fluid can be estimated by a simple structure.

BRIEF DESCRIPTION OF THE DRAWINGS

Exemplary embodiments of the present disclosure will be described in detail based on the following figures, wherein.

DETAILED DESCRIPTION

A vehicle system relating to embodiments of the present disclosure is described by using FIG. 1 through FIG. 11.

First Embodiment

Figure 1:
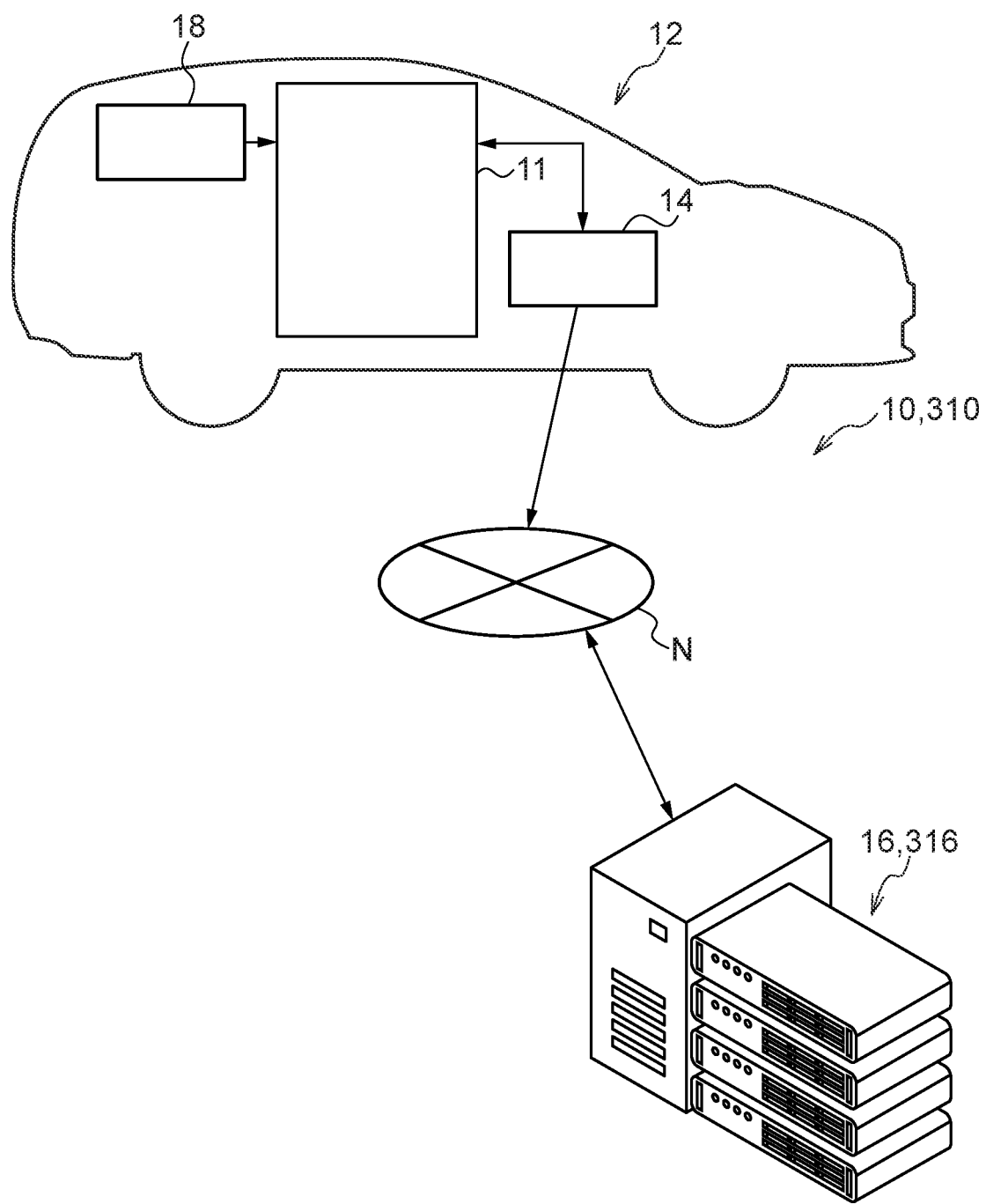
FIG. 1 is a drawing illustrating the schematic structure of a vehicle system relating to first, second and third embodiments.

FIG. 1 is a block drawing illustrating the schematic structure of a vehicle system 10 relating to a first embodiment.

(Overall Structure)

As illustrated in FIG. 1, the vehicle system 10 relating to the present embodiment includes a vehicle 12 and a managing server 16.

The vehicle 12 and the managing server 16 are respectively structured so as to be able to communicate via network N. Here, the vehicle 12 has a communication section 14 that is connected to the network N. The network N includes a mobile communications service such as 3G, LTE or the like, or an internet line.

(Vehicle)

Figure 2:
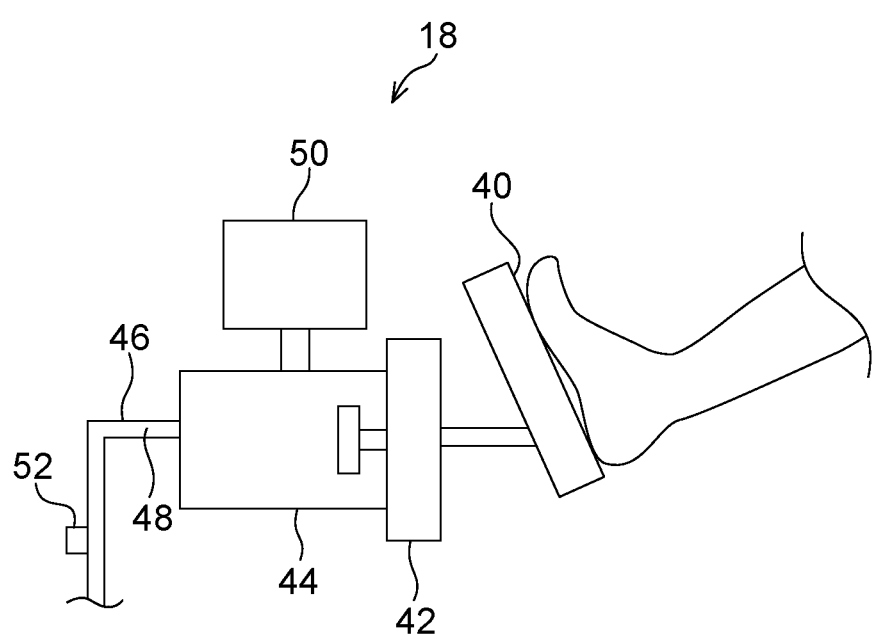
FIG. 2 is a schematic drawing illustrating the structure of a brake device of a vehicle relating to the first, second and third embodiments.

The vehicle 12 has a hydraulic brake device 18. As illustrated in FIG. 2, the brake device 18 is structured to include a brake pedal 40 that is provided at the driver's seat and is operated by being depressed by the driver, a brake booster 42 that increases the depressing force applied to the brake pedal 40, a master cylinder 44 provided integrally with the brake booster 42 and generating hydraulic pressure of brake fluid 48 corresponding to the stepping force applied to the brake pedal 40, a brake pipe 46 connecting the master cylinder 44 and brake mechanisms (e.g., brake discs) of the respective wheels, a reservoir tank 50 that is provided at the upper portion of the master cylinder 44 and in which the brake fluid 48 is stored such that the brake fluid 48 is injected into and always filled into the brake pipe 46, and a hydraulic pressure sensor 52 that detects the hydraulic pressure of the brake fluid 48 within the brake pipe 46. Note that the hydraulic pressure sensor 52 may be provided at a brake actuator (not illustrated) for controlling the brakes of an ABS (Antilock Brake System) or the like.

Figure 3:
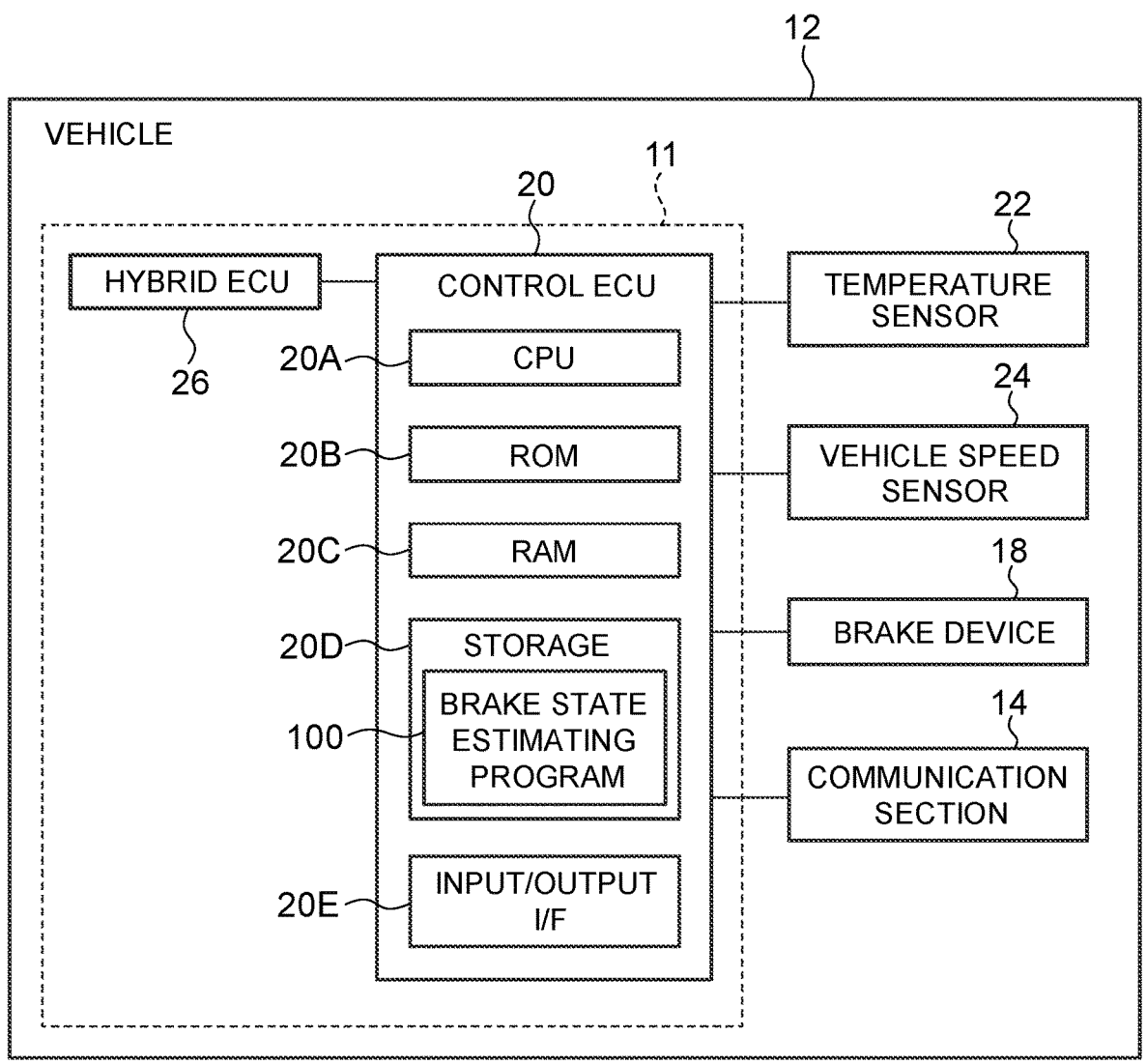
FIG. 3 is a block drawing illustrating hardware structures of the vehicle relating to the first, second and third embodiments.

As illustrated in FIG. 3, onboard devices 11 that are installed in the vehicle 12 include a control ECU (Electronic Control Unit) 20, a temperature sensor 22, a vehicle speed sensor 24, a hybrid ECU 26 and the communication section 14.

The temperature sensor 22 detects the air temperature at the periphery of the vehicle 12. The vehicle speed sensor 24 detects the vehicle speed of the vehicle 12. On the basis of signals from various sensors including an accelerator opening sensor (not illustrated), the vehicle speed sensor 24 and the like, the hybrid ECU 26 sets the operation mode (engine running mode, motor running mode, or the like), and sets the engine torque and the motor torque, and commands an engine ECU (not illustrated) and a motor ECU (not illustrated). Further, the hybrid ECU 26 detects the regeneration amount of the motor.

The control ECU 20 is structured to include a CPU (Central Processing Unit) 20A, a ROM (Read Only Memory) 20B, a RAM (Random Access Memory) 20C, a storage 20D and an input/output I/F (Inter Face) 20E. The CPU 20A, the ROM 20B, the RAM 20C and the input/output I/F 20E are connected so as to be able to communicate with one another via an unillustrated internal bus. The CPU 20A is an example of the processor, and the RAM 20C is an example of the memory.

The CPU 20A is a central computing processing unit, and executes various programs and controls the respective sections. Namely, the CPU 20A reads-out programs from the ROM 20B, and executes the programs by using the RAM 20C as a workspace.

The ROM 20B stores various programs and various data. The RAM 20C temporarily stores programs and data as a workspace.

A brake state estimating program 100 is stored in the storage 20D. The storage 20D is structured by, for example, an HDD (Hard Disk Drive) or an SSD (Solid State Drive).

The input/output I/F 20E is an interface for communicating with the brake device 18, the temperature sensor 22, the vehicle speed sensor 24, the hybrid ECU 26 and the communication section 14, respectively.

With braking fluid, there is the problem that the stopping distance increases due to a phenomenon called vapor lock. Vapor lock affects the boiling point of brake fluid. The amount of moisture, which is a cause of a decrease in the boiling point, is determined by the total heat load, the duration and the humidity.

Current systems are setups in which leaking of brake fluid is detected by a sensor at the reservoir tank. The total amount of the brake fluid is detected by the sensor, but how much moisture is contained in the brake fluid itself and the state of deterioration of the brake fluid cannot be judged objectively or quantitatively.

Even if automobile manufacturers set the time for replacement to be at the time of the mandatory vehicle inspection which is every two years, the state of the brake fluid also depends on the traveling situation of the vehicle, and therefore, the brake fluid replacement time is not always uniform. For example, the replacement time may be earlier or may be later, depending on the dirtying of and the deteriorated state of the brake fluid. Ultimately, Japanese automobile manufacturers basically uniformly recommend that the replacement time of the brake fluid be replacement at the time of each mandatory vehicle inspection.

The psychology of a user who is having their vehicle inspected may include the point that, if dirtying of the brake fluid cannot be visually recognized, it would be better to reduce the costs of the mandatory vehicle inspection. Actual circumstances are that there are vehicles in which, in cases in which the vehicle undergoes an owner-performed inspection or an inspection at a privately-owned business, the brake fluid of the vehicle may not be replaced.

In this way, a method of judging the actual deteriorated state of the brake fluid because the brake pipe into which the brake fluid is injected is closed-off, is a method using the amount in the reservoir tank and the color of the brake fluid. Immediately after replacing brake fluid, the brake fluid is substantially transparent, but, as the brake fluid deteriorates, it changes from transparent to yellow to brown and then to black. In many vehicles, the color of the brake fluid is yellow, and the deteriorated state cannot be judged from the color of the brake fluid.

Thus, in the present embodiment, the onboard devices 11 estimate the state of deterioration of the brake fluid by using traveling data of the vehicle.

Figure 4:
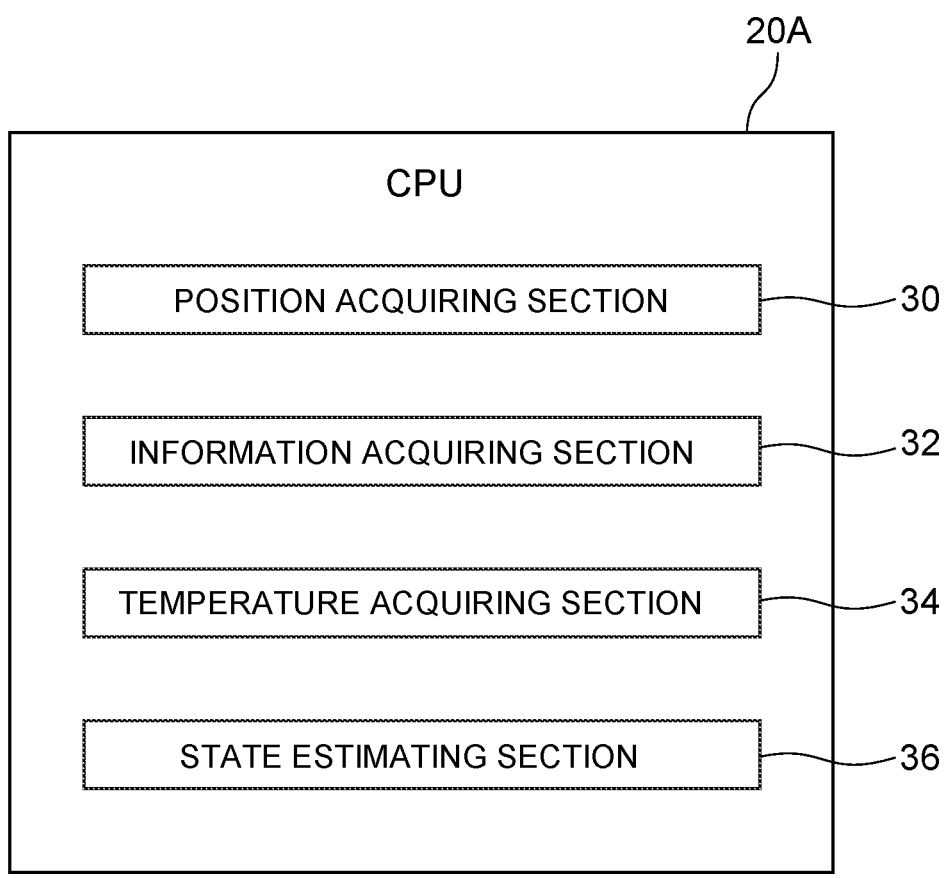
FIG. 4 is a block drawing illustrating an example of functional structures of a CPU of a control ECU at onboard devices of the first and second embodiments.

Specifically, as illustrated in FIG. 4, at the control ECU 20 of the present embodiment, due to the CPU 20A executing the brake state estimating program 100, the CPU 20A functions as a position acquiring section 30, an information acquiring section 32, a temperature acquiring section 34, and a state estimating section 36.

The position acquiring section 30 acquires the position of the vehicle 12. The position acquiring section 30 acquires the longitude and latitude of the position of the vehicle 12 from, for example, a navigation system installed in the vehicle 12.

On the basis of the position of the vehicle 12 acquired by the position acquiring section 30, the information acquiring section 32 acquires duration information that expresses the duration of staying in an area that includes the position of the vehicle. Further, on the basis of the position of the vehicle 12 acquired by the position acquiring section 30, the information acquiring section 32 acquires humidity information. For example, the information acquiring section 32 transmits the position of the vehicle 12, which was acquired by the position acquiring section 30, to the managing server 16 by the communication section 14, and acquires, from the managing server and as humidity information corresponding to the position of the vehicle 12, a factor expressing the relationship between the duration and the amount of moisture contained in the brake fluid, which relationship is determined in advance for the area that includes the position of the vehicle 12.

The temperature acquiring section 34 acquires the temperature of the brake device 18. Specifically, the temperature acquiring section 34 computes the temperature of the brake device 18 on the basis of the air temperature detected by the temperature sensor 22, the vehicle speed detected by the vehicle speed sensor 24, the hydraulic pressure of the brake fluid 48 detected by the hydraulic pressure sensor 52 of the brake device 18, and the regeneration amount detected by the hybrid ECU 26.

For example, each predetermined time period, the temperature acquiring section 34 acquires the air temperature detected by the temperature sensor 22, the vehicle speed detected by the vehicle speed sensor 24, the hydraulic pressure of the brake fluid 48 detected by the hydraulic pressure sensor 52 of the brake device 18, and the regeneration amount detected by the hybrid ECU 26. The temperature acquiring section 34 computes temperature TR of the brake disc by cumulatively estimating a change amount $\Delta T$ of the temperature of the brake disc during $\Delta t$ seconds, in accordance with following formula (1) and formula (2).

$$\Delta T = \frac{Q_{in} - Q_{out}}{W_b * C} \tag{1}$$

$$T_R = T_{before} + \Delta T \tag{2}$$

Here, $Q_{in}$ is the brake absorption energy, $Q_{out}$ is the brake heat dissipation energy, $W_b$ is the weight of the sliding portion of the brake disc, C is the specific heat, and $T_{before}$ is the temperature of the brake disc before $\Delta t$ seconds. Further, $\Delta t$ is the sampling period.

The brake absorption energy $Q_{in}$ at the time of braking is expressed by the following formula.

$$Q_{in} = P * A_b * 2 * \mu * \frac{V}{2\pi R} * 2\pi R * \Delta t$$

Here, P is the hydraulic pressure of the brake fluid 48, $A_b$ is the surface area of the sliding portion of the brake disc, ρ is the coefficient of friction of the pad, and R is the braking effective radius (the distance between the tire center and the caliper piston center).

Further, at times other than the time of braking, in cases in which regenerative braking is not considered, the brake absorption energy $Q_{in}$ is expressed by the following formula.

$$Q_{in} = \frac{1}{2}M(V^2 - V_{before}^2)*\alpha*C_1*C_2*\frac{1}{2}$$

Here, M is the weight of the vehicle 12, V is the vehicle speed, $V_{before}$ is the vehicle speed $\Delta t$ seconds before, $\alpha$ is the braking force distribution, $C_1$ is the traveling resistance loss factor, and $C_2$ is the heat loss factor at other than the sliding portion of the disc brake.

Further, at times other than the time of braking, in cases in which regenerative braking is taken into consideration, the brake absorption energy $Q_{in}$ is expressed by the following formula.

$$Q_{in} = \frac{1}{2}M(V^2 - V_{before}^2)*\alpha*C_1*C_2*\frac{1}{2} - W_{in}*\Delta t$$

Here, $W_{in}$ is the regeneration amount.

Further, the braking heat dissipating energy $Q_{out}$ is expressed by the following formula.

$$Q_{out} = h_V * A_b * (T_{before} - T_{atm}) * \Delta T$$

Here, by is the heat transfer coefficient, and Tam, is the air temperature detected by the temperature sensor 22.

The state estimating section 36 estimates the state of deterioration of the brake fluid 48 on the basis of humidity information, duration information expressing the duration of staying in the area that includes the position of the vehicle, and the temperature of the brake device 18.

Specifically, the state estimating section 36 estimates the state of the moisture contained in the brake fluid 48 on the basis of the humidity information and the duration information, and estimates the heat state of the brake fluid on the basis of the temperature of the brake device 18, and estimates the state of deterioration of the brake fluid 48 on the basis of the moisture state and the heat state.

For example, each time the temperature of the brake disc exceeds a threshold temperature, the value of the heat state, which expresses the deteriorated state of the brake fluid 48 due to heat, is incremented by 1, and the possibility that vapor lock has occurred is inferred. It suffices for the threshold temperature to be a temperature at which the efficacy of the brake deteriorates.

Further, a factor, which expresses the relationship between the duration and the amount of moisture contained in the brake fluid, per area that is readied in advance by utilizing big data is stored in the managing server 16 as humidity information. In particular, it is known that there is a difference in the relationship between the duration and the amount of moisture contained in the brake fluid, between areas of high humidity and areas of low humidity.

Thus, on the basis of the duration information and factor B of the area that is obtained as humidity information from the managing server 16, moisture amount Y is computed (see FIG. 5) in accordance with the following formula. Each time that the moisture amount Y exceeds the threshold value, the value of the moisture state, which expresses the deteriorated state of the brake fluid 48 due to a decrease in the boiling point, is incremented by one.

$$Y = B \times T$$

Here, T is the duration from the point in time when the value of moisture state was incremented by one the previous time.

Figure 5:
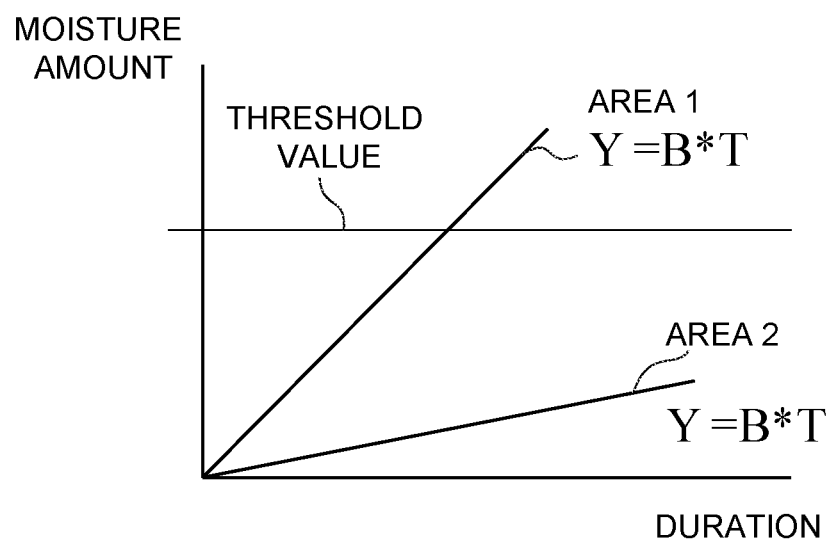
FIG. 5 is a graph showing the relationship between moisture amount and duration, per area.

FIG. 5 illustrates an example in which the moisture amount exceeds the threshold value in area 1 in which the humidity is high, and, on the other hand, the moisture amount does not exceed the threshold value in area 2 in which the humidity is low.

Figure 6:
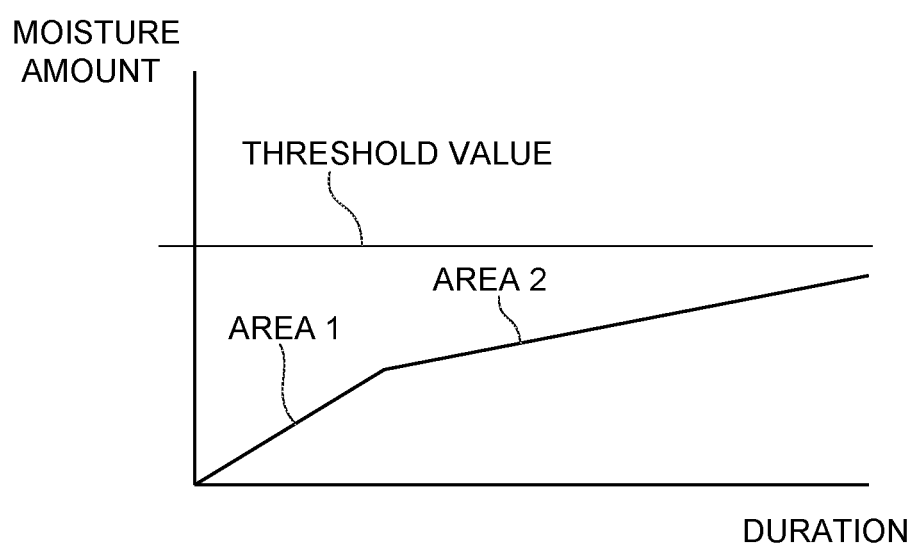
FIG. 6 is a graph illustrating the relationship between moisture amount and duration in a case of staying in plural areas.

Note that, in a case of staying in plural areas during the duration from the point in time when the value of moisture state was incremented by one the previous time, it suffices to compute the moisture amount Y in accordance with the above formula and on the basis of the factors B of the areas and the duration information for each of the areas, and to add the moisture amounts (see FIG. 6).

FIG. 6 illustrates an example of the relationship between the moisture amount and the duration in a case of staying in area 1 in which the humidity is high and in area 2 in which the humidity is low.

Figure 7:
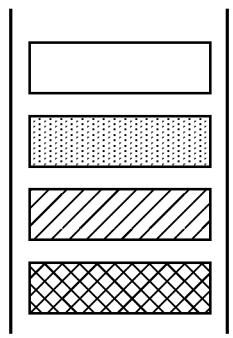
FIG. 7 is a drawing illustrating an example of display of results of estimating the state of deterioration of brake fluid.

The state estimating section 36 estimates the value, which is the sum of the value of the heat state and the value of the moisture state, as the deteriorated state of the brake fluid 48. As illustrated in FIG. 7, the state estimating section 36 displays the deteriorated state of the brake fluid 48 on a display (not illustrated) of the onboard devices 11. FIG. 7 illustrates an example in which the deteriorated state of the brake fluid 48 is displayed in levels of four stages. Note that the deteriorated state of the brake fluid 48 may be displayed on a terminal (e.g., a diagnostic device) at a dealer that is connected to the onboard devices 11.

(Managing Server)

The managing server 16 stores, as the humidity information and per area, the factor that expresses the relationship between the duration and the amount of moisture contained in the brake fluid, which factor has been prepared in advance. When the managing server 16 receives, from the onboard devices 11, the position of the vehicle 12 that has been acquired by the position acquiring section 30, the managing server 16 stores that position as humidity information corresponding to the area that includes the position of the vehicle 12. The factor that expresses the relationship between the duration and the amount of moisture contained in the brake fluid is transmitted to the onboard devices 11 via the network N.

(Flow of Processing)

The flow of processing at the vehicle system 10 of the first embodiment is described next by using the flowchart of FIG. 8.

First, while the vehicle 12 is traveling, each predetermined time period, the control ECU 20 of the onboard devices 11 acquires the air temperature detected by the temperature sensor 22, the vehicle speed detected by the vehicle speed sensor 24, the hydraulic pressure of the brake fluid 48 detected by the hydraulic pressure sensor 52 of the brake device 18, and the regeneration amount detected by the hybrid ECU 26.

Figure 8:
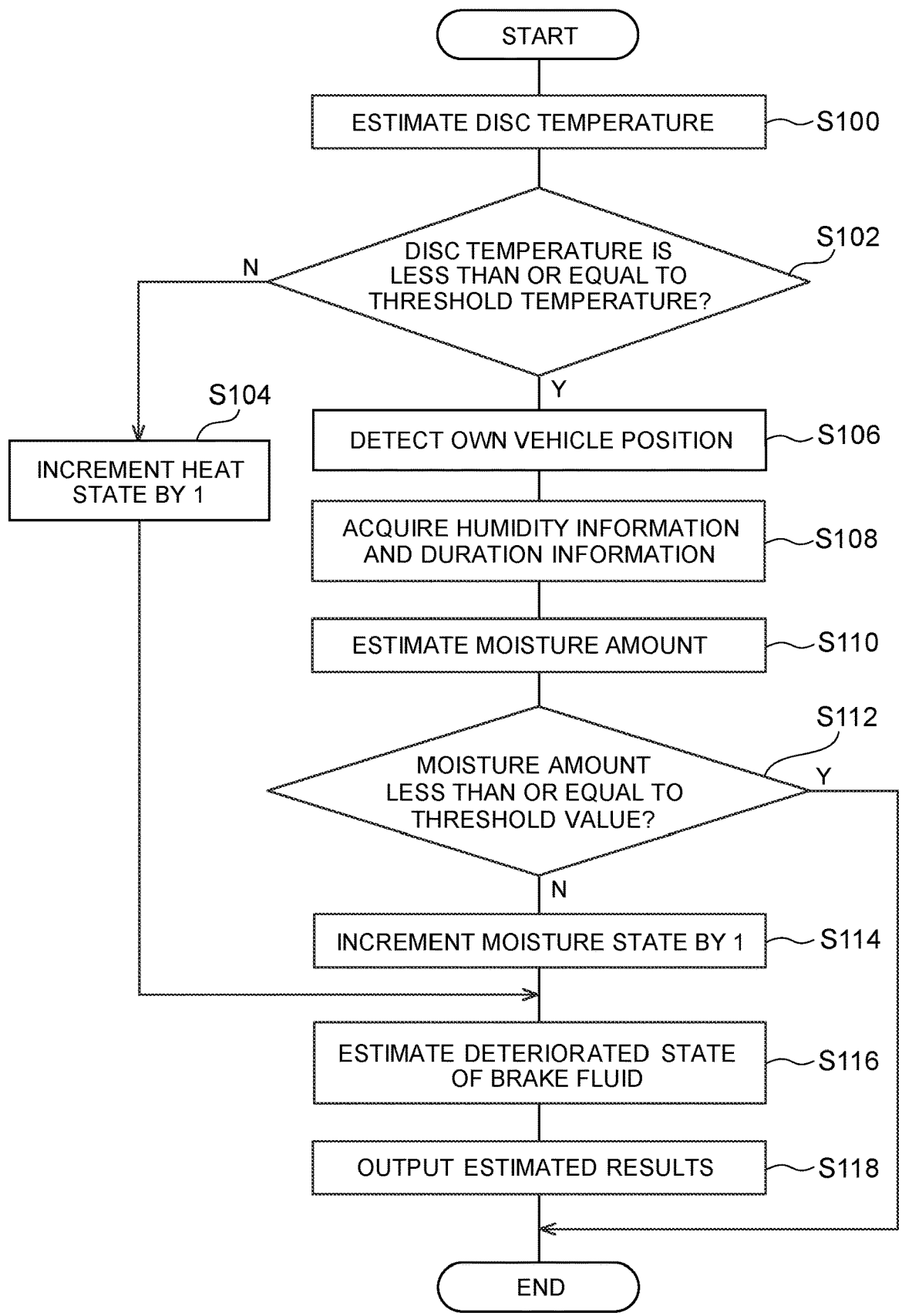
FIG. 8 is a flowchart illustrating an example of the flow of brake state estimating processing that is executed at the CPU of the control ECU at the onboard devices of the first embodiment.

Then, when the ignition switch (not illustrated) of the vehicle 12 is turned off, the CPU 20A of the control ECU 20 of the onboard devices 11 executes the brake state estimating program 100, and thereby carries out the brake state estimating processing illustrated in FIG. 8.

First, in step S100, on the basis of the air temperature detected by the temperature sensor 22, the vehicle speed detected by the vehicle speed sensor 24, the hydraulic pressure of the brake fluid 48 detected by the hydraulic pressure sensor 52 of the brake device 18, and the regeneration amount detected by the hybrid ECU 26, which are acquired each predetermined time period, the CPU 20A as the temperature acquiring section 34 cumulatively estimates the change amount ΔT of the temperature of the brake disc during Δt seconds, and thereby computes the temperature TR of the brake disc for each predetermined time period.

In step S102, the CPU 20A as the state estimating section 36 judges whether or not the temperature of the brake disc that was computed in above step S100 is less than or equal to a threshold temperature. If the temperature of the brake disc exceeds the threshold temperature, the CPU 20A moves on to step S104. On the other hand, if the temperature of the brake disc is less than or equal to the threshold temperature, the CPU 20A moves on to step S106. Note that the threshold temperature differs depending on the type of the brake fluid, i.e., the different standards such as DOT3, DOT4, DOT5.1 and the like of FMVS standards (Federal Motor Vehicle Safety Standards) of the U.S.

In step S104, the CPU 20A as the state estimating section 36 increments by one the value of the heat state, which expresses the state of deterioration of the brake fluid 48 due to heat, and moves on to step S116.

In step S106, the CPU 20A as the position acquiring section 30 acquires the position of the vehicle 12.

In step S108, on the basis of the position of the vehicle 12 acquired in above step S106, the CPU 20A as the information acquiring section 32 acquires the duration information that expresses the duration of staying in the area that includes the position of the vehicle. Further, on the basis of the position of the vehicle 12 acquired in above step S106, the CPU 20A as the information acquiring section 32 acquires humidity information.

In step S110, the CPU 20A as the state estimating section 36 computes the moisture amount on the basis of the duration information and the factor B of the area including the position of the vehicle 12 that was obtained as the humidity information in above step S108.

In step S112, the CPU 20A as the state estimating section 36 judges whether or not the moisture amount computed in above step S110 is less than or equal to a threshold value. If the moisture amount exceeds the threshold value, the CPU 20A moves on to step S114. On the other hand, if the moisture amount is less than or equal to the threshold value, the CPU 20A ends the brake state estimating processing. Note that the threshold value relating to the moisture amount differs in accordance with the type of brake fluid.

In step S114, the CPU 20A as the state estimating section 36 increments by 1 the value of the moisture state that expresses the state of deterioration of the brake fluid 48 due to a decrease in the boiling point.

In step S116, the CPU 20A as the state estimating section 36 estimates the value, which is the sum of the value of the heat state and the value of the moisture state, as the state of deterioration of the brake fluid 48.

In step S118, the CPU 20A displays the state of deterioration of the brake fluid 48 on a display (not illustrated) of the onboard devices 11, and ends the brake state estimating processing.

Overview of First Embodiment

At the vehicle 12 of the present embodiment, the control ECU 20 is structured so as to estimate the state of the moisture contained in the brake fluid on the basis of the humidity information and the duration information, and estimate the heat state of the brake fluid on the basis of the temperature of the brake device, and estimate the state of deterioration of the brake fluid on the basis of the moisture state and the heat state. In this way, the control ECU 20 estimates the state of deterioration of the brake fluid by taking the moisture state and the heat state of the brake fluid into consideration. Due thereto, the state of deterioration of the brake fluid can be estimated accurately by a simple structure.

Further, the managing server 16 is structured so as to store a factor, which expresses the relationship between the duration and the amount of moisture contained in the brake fluid, per area as humidity information. Due thereto, at the managing server 16 side, changing of the factor, which expresses the relationship between the duration and the amount of moisture contained in the brake fluid, per area can be carried out easily.

Further, at the time when the ignition switch of the vehicle 12 is turned off, various information are transmitted from the onboard devices 11 to the managing server 16, and therefore, the communication load can be reduced.

Second Embodiment

In the first embodiment, the state of the moisture contained in the brake fluid is estimated on the basis of the humidity information and the duration information, and the heat state of the brake fluid is estimated on the basis of the temperature of the brake device, and the state of deterioration of the brake fluid is estimated on the basis of the moisture state and the heat state. In contrast, the second embodiment differs from the first embodiment with regard to the point that the deteriorated state is estimated by using a learned model for estimating the deteriorated state of the brake fluid on the basis of the temperature of the brake device, humidity information, and duration information. The points that differ from the first embodiment are described hereinafter. Note that the same structures are denoted by the same reference numerals, and description thereof is omitted.

(Vehicle)

The state estimating section 36 of the onboard devices 11 of the present embodiment estimates the deteriorated state of the brake fluid 48 by using a learned model for estimating the deteriorated state of the brake fluid 48 on the basis of humidity information, duration information expressing the duration of staying in the area that includes the position of the vehicle, and the temperature of the brake device 18.

Specifically, a learned model is prepared in advance whose inputs are the factor of the area obtained as the humidity information, the duration information expressing the duration of staying in the area that includes the position of the vehicle, and the temperature of the brake device 18, and that outputs a level expressing the state of deterioration of the brake fluid 48. Note that the learned model differs in accordance with the type of the brake fluid 48.

Then, the state estimating section 36 inputs, to the learned model, the factor of the area that is obtained as humidity information, and the duration information expressing the duration of staying in the area that includes the position of the vehicle, and the temperature of the brake device 18, and the state estimating section 36 uses the output of the learned model as the results of estimating the deteriorated state of the brake fluid 48.

(Flow of Processing) The flow of processing at the vehicle system 10 of the second embodiment is described next by using the flowchart of FIG. 9.

First, while the vehicle 12 is traveling, the control ECU 20 of the onboard devices 11 acquires the air temperature detected by the temperature sensor 22, the vehicle speed detected by the vehicle speed sensor 24, the hydraulic pressure of the brake fluid 48 detected by the hydraulic pressure sensor 52 of the brake device 18, and the regeneration amount detected by the hybrid ECU 26.

Figure 9:
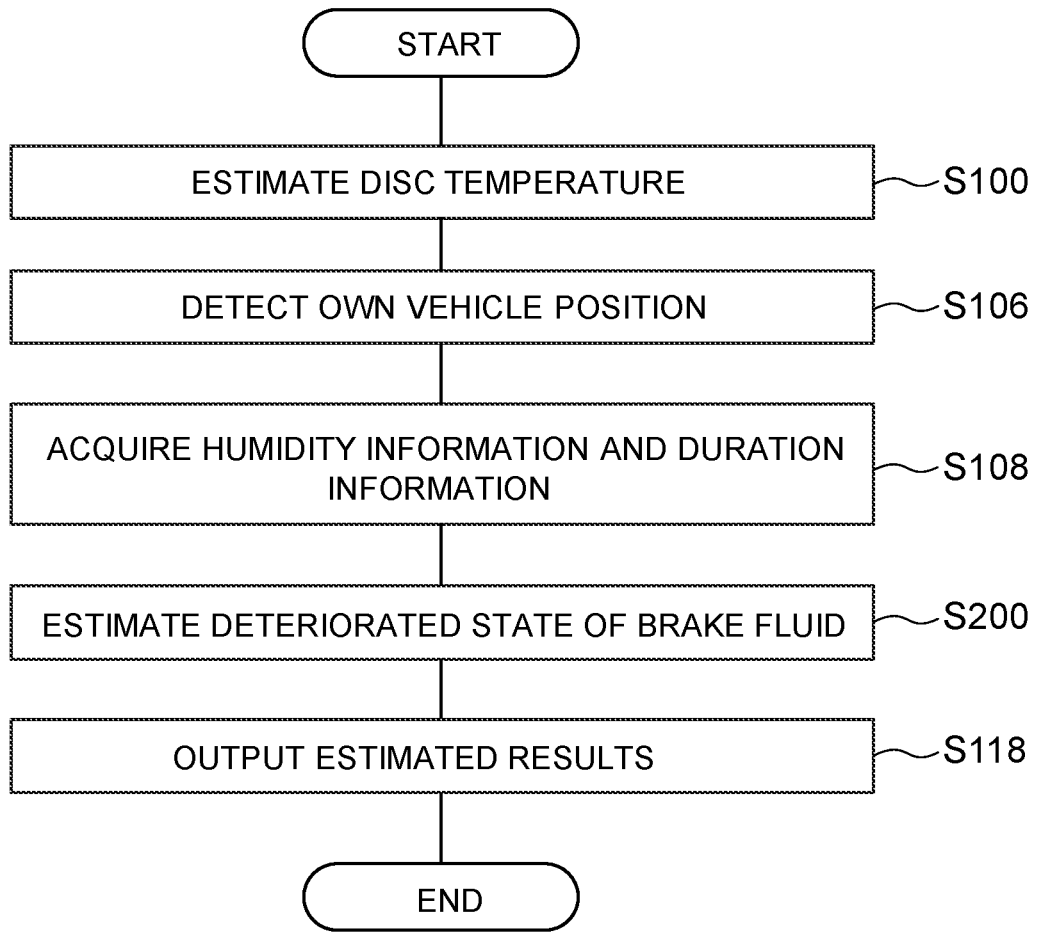
FIG. 9 is a flowchart illustrating an example of the flow of brake state estimating processing that is executed at the CPU of the control ECU at the onboard devices of the second embodiment.

Then, when the ignition switch (not illustrated) of the vehicle 12 is turned off, the CPU 20A of the control ECU 20 of the onboard devices 11 executes the brake state estimating program 100, and thereby carries out the brake state estimating processing illustrated in FIG. 9. Note that processings that are similar to those of the first embodiment are denoted by the same step numbers, and detailed description thereof is omitted.

First, in step S100, on the basis of the air temperature detected by the temperature sensor 22, the vehicle speed detected by the vehicle speed sensor 24, the hydraulic pressure of the brake fluid 48 detected by the hydraulic pressure sensor 52 of the brake device 18, and the regeneration amount detected by the hybrid ECU 26, which are acquired each predetermined time period, the CPU 20A as the temperature acquiring section 34 cumulatively estimates the change amount ΔT of the temperature of the brake disc during Δt seconds, and thereby computes the temperature TR of the brake disc for each predetermined time period.

In step S106, the CPU 20A as the position acquiring section 30 acquires the position of the vehicle 12.

In step S108, on the basis of the position of the vehicle 12 acquired in above step S106, the CPU 20A as the information acquiring section 32 acquires the duration information that expresses the duration of staying in the area that includes the position of the vehicle. Further, on the basis of the position of the vehicle 12 acquired in above step S106, the CPU 20A as the information acquiring section 32 acquires humidity information.

In step S200, the CPU 20A as the state estimating section 36 inputs, to the learned model, the maximum temperature of the brake disc temperatures computed in above step S100, and the factor of the area that includes the position of the vehicle 12 which factor was obtained as the humidity information in above step S108, and the duration information, and estimates the state of deterioration of the brake fluid 48.

In step S118, the CPU 20A displays the state of deterioration of the brake fluid 48 on a display (not illustrated) of the onboard devices 11, and ends the brake state estimating processing.

Overview of Second Embodiment

The vehicle 12 of the present embodiment is structured such that the control ECU 20 estimates the deteriorated state of the brake fluid by using a learned model for estimating the deteriorated state of the brake fluid on the basis of the temperature of the brake device, humidity information, and duration information. Due thereto, the state of deterioration of the brake fluid can be estimated accurately by a simple structure.

Third Embodiment

In the first and second embodiments, the state of deterioration of the brake fluid is estimated at the onboard devices. In contrast, the third embodiment differs from the first and second embodiments with regard to the point that the deteriorated state of the brake fluid of the vehicle is estimated at the managing server side. The points that differ from the first embodiment are described hereinafter. Note that the same structures are denoted by the same reference numerals, and description thereof is omitted.

(Overall Structure)

As illustrated in above-described FIG. 1, a vehicle system 310 relating to the present embodiment includes the vehicle 12 and a managing server 316.

(Vehicle)

The onboard devices 11 installed in the vehicle 12 periodically acquire the longitude and latitude of the position of the vehicle 12 from a navigation system installed in the vehicle 12, and transmit the longitude and latitude from the communication section 14 to the managing server 316.

The onboard devices 11 acquire the air temperature detected by the temperature sensor 22, the vehicle speed detected by the vehicle speed sensor 24, the hydraulic pressure of the brake fluid 48 detected by the hydraulic pressure sensor 52 of the brake device 18, and the regeneration amount detected by the hybrid ECU 26, and transmit these information from the communication section 14 to the managing server 316 each predetermined time period.

Further, the onboard devices 11 acquire results of estimation of the deteriorated state of the brake fluid from the managing server 316, and display the results of estimation on a display (not illustrated) of the onboard devices 11.

(Managing Server)

Figure 10:
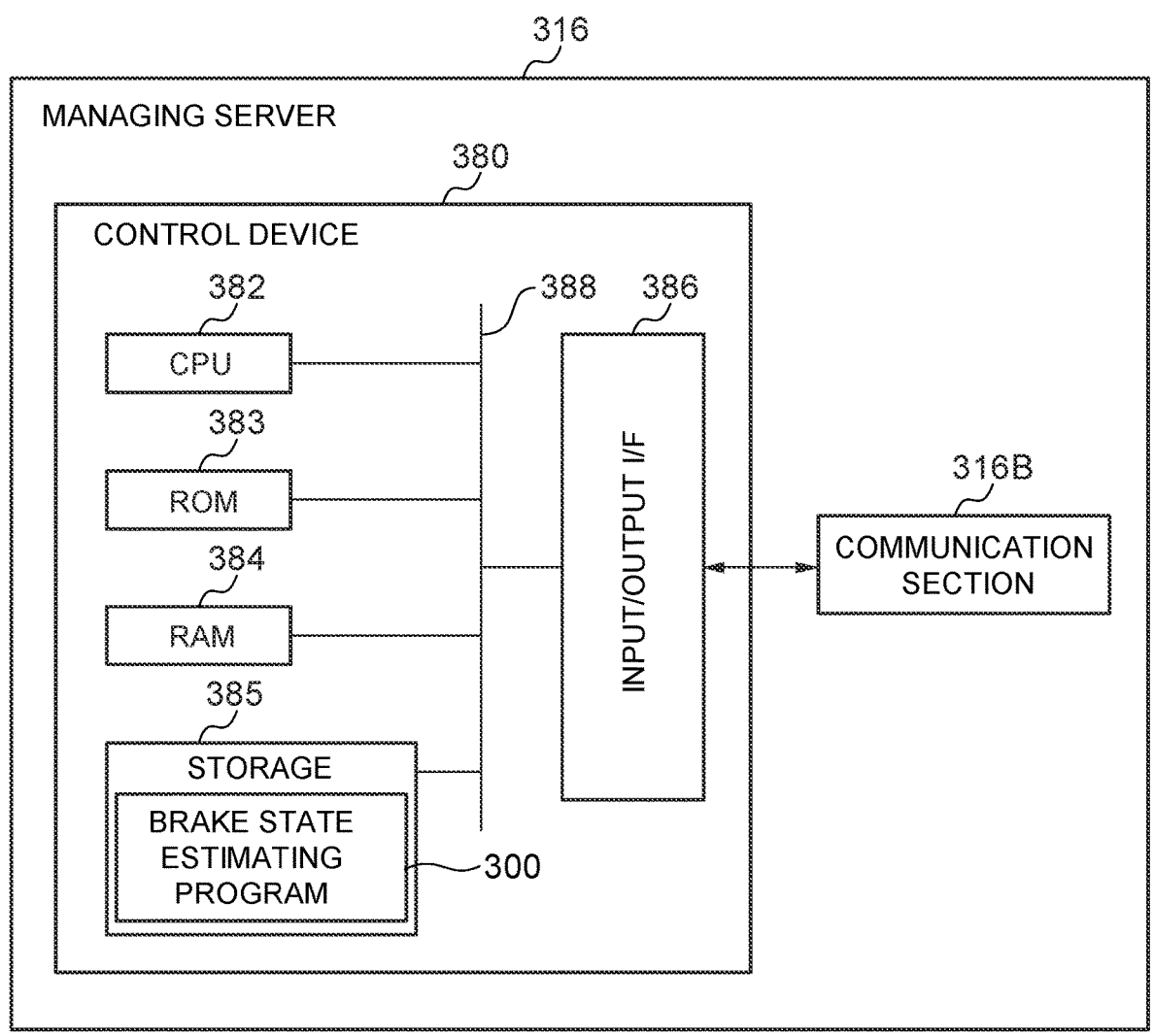
FIG. 10 is a block drawing illustrating hardware structures of a managing server of the third embodiment.

As illustrated in FIG. 10, the managing server 316 is structured to include a control device 380 and a communication section 316B.

The control device 380 has a CPU 382, a ROM 383, a RAM 384, a storage 385, and an input/output I/F 386. The CPU 382, the ROM 383, the RAM 384, the storage 385 and the input/output I/F 386 are connected to one another via a bus 388. The CPU 382 is an example of the processor, and the RAM 384 is an example of the memory.

The respective functions of the CPU 382, the ROM 383, the RAM 384, the storage 385 and the input/output I/F 386 are the same as those of the above-described CPU 20A, ROM 20B, RAM 20C, storage 20D and input/output I/F 20E.

The CPU 382 reads-out a brake state estimating program 300 from the storage 385, and executes the program by using the RAM 384 as a workspace. In the present embodiment, the brake state estimating program 300 is stored in the storage 385.

The communication section 316B is connected to the control device 380 of the present embodiment via the input/output I/F 386. Note that the communication section 316B may be directly connected to the bus 388.

Figure 11:
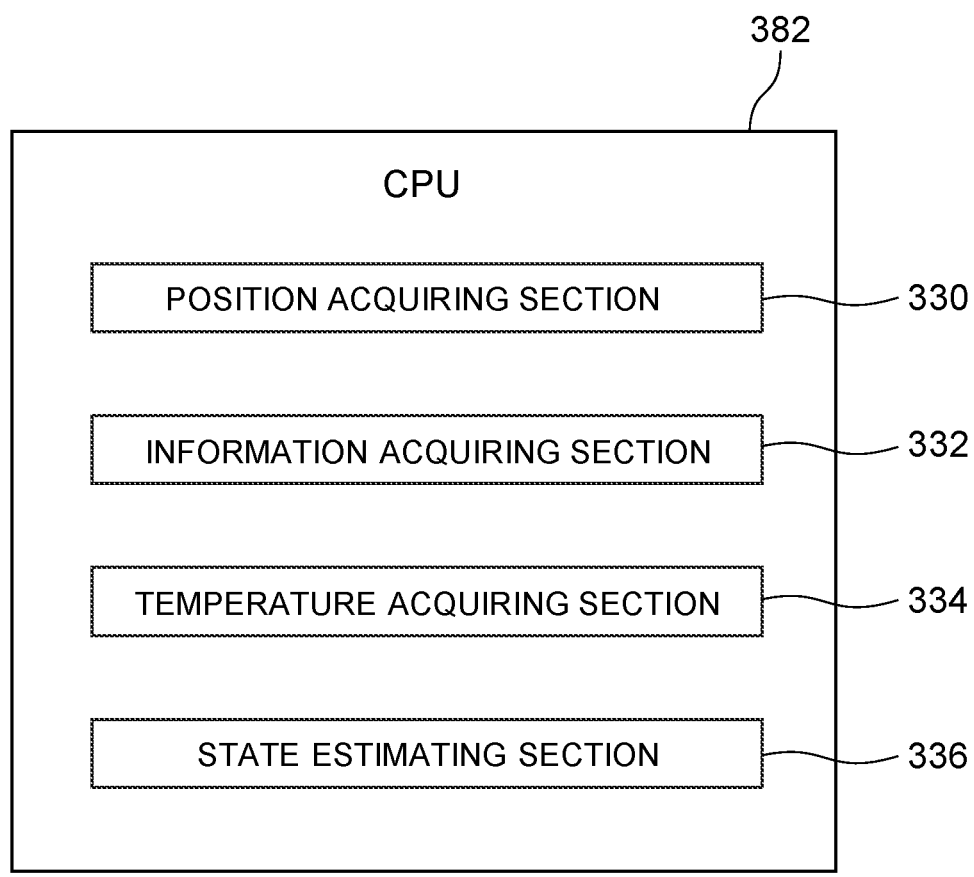
FIG. 11 is a block drawing illustrating an example of functional structures of a CPU of a control device at the managing server of the third embodiment.

As illustrated in FIG. 11, at the control device 380 of the present embodiment, due to the CPU 382 executing the brake state estimating program 300, the CPU 382 functions as a position acquiring section 330, an information acquiring section 332, a temperature acquiring section 334, and a state estimating section 336.

The position acquiring section 330 acquires the longitude and the latitude of the position of the vehicle 12 that are received from the onboard devices 11 of the vehicle 12.

On the basis of the position of the vehicle 12 acquired by the position acquiring section 330, the information acquiring section 332 acquires duration information that expresses the duration of staying in the area that includes the position of the vehicle. Further, on the basis of the position of the vehicle 12 acquired by the position acquiring section 330, the information acquiring section 332 acquires humidity information. For example, the information acquiring section 332 retains, as humidity information, a factor that expresses the relationship between the duration and the amount of moisture contained in the brake fluid, per area that has been readied in advance. The information acquiring section 332 acquires the factor that expresses the relationship between the duration and the amount of moisture contained in the brake fluid, and that serves as the humidity information corresponding to the area that includes the position of the vehicle 12 acquired by the position acquiring section 330.

The temperature acquiring section 334 acquires the temperature of the brake device 18 that was received from the onboard devices 11 of the vehicle 12. Specifically, in the same way as the temperature acquiring section 34 of the above-described first embodiment, the temperature acquiring section 334 computes the temperature of the brake device 18 on the basis of the air temperature detected by the temperature sensor 22, the vehicle speed detected by the vehicle speed sensor 24, the hydraulic pressure of the brake fluid 48 detected by the hydraulic pressure sensor 52 of the brake device 18, and the regeneration amount detected by the hybrid ECU 26, which were received from the onboard devices 11 of the vehicle 12.

The state estimating section 336 estimates the state of deterioration of the brake fluid 48 on the basis of the humidity information, the duration information that expresses the duration of staying in the area that includes the position of the vehicle, and the temperature of the brake device 18.

Specifically, in the same way as the state estimating section 36 in the above-described first embodiment, the state estimating section 336 estimates the state of the moisture continued in the brake fluid 48 on the basis of the humidity information and the duration information, and estimates the heat state of the brake fluid 48 on the basis of the temperature of the brake device 18, and estimates the state of deterioration of the brake fluid 48 on the basis of the moisture state and the heat state.

The state estimating section 336 transmits the results of estimation of the deteriorated state of the brake fluid 48 from the communication section 316B via the network N to the onboard devices 11.
(Flow of Processing)

First, while the vehicle 12 is traveling, the control ECU 20 of the onboard devices 11 acquires, each predetermined time period, the air temperature detected by the temperature sensor 22, the vehicle speed detected by the vehicle speed sensor 24, the hydraulic pressure of the brake fluid 48 detected by the hydraulic pressure sensor 52 of the brake device 18, and the regeneration amount detected by the hybrid ECU 26, and transmits these information from the communication section 14 to the managing server 316.

Further, the onboard devices 11 periodically acquire the longitude and latitude of the position of the vehicle 12 from the navigation system installed in the vehicle 12, and transmit the longitude and latitude from the communication section 14 to the managing server 316.

Then, when the ignition switch (not illustrated) of the vehicle 12 is turned off, the onboard devices 11 transmit a request to estimate the deteriorated state of the brake fluid 48, from the communication section 14 to the managing server 316.

Then, when the managing server 316 receives the request to estimate the deteriorated state of the brake fluid 48 from the onboard devices 11, the CPU 382 of the control device 380 of the managing server 316 executes the brake state estimating program 300, and thereby carries out processing that is similar to the brake state estimating processing illustrated in above-described FIG. 8.

Overview of Third Embodiment

The managing server 316 of the present embodiment is structured such that the control device 380 estimates the state of the moisture contained in the brake fluid on the basis of the humidity information and the duration information, and estimates the heat state of the brake fluid on the basis of the temperature of the brake device, and estimates the state of deterioration of the brake fluid on the basis of the moisture state and the heat state. In this way, the control device 380 estimates the state of deterioration of the brake fluid by taking the moisture state and the heat state of the brake fluid into consideration. Due thereto, the state of deterioration of the brake fluid can be estimated accurately by a simple structure.

Further, the managing server 316 is structured so as to estimate the state of the moisture contained in the brake fluid on the basis of the humidity information and the duration information, and estimate the heat state of the brake fluid on the basis of the temperature of the brake device. Due thereto, at the managing server 316 side, the threshold values relating to the moisture state and the heat state can be changed easily.

Modified Example of Third Embodiment

The third embodiment describes, as an example, a case in which the managing server 316 estimates the state of the moisture contained in the brake fluid on the basis of the humidity information and the duration information, and estimates the heat state of the brake fluid on the basis of the temperature of the brake device, and estimates the deteriorated state of the brake fluid on the basis of the moisture state and the heat state. However, the present disclosure is not limited to this. In the same way as in the above-described second embodiment, the state estimating section 336 of the managing server 316 may input the factor of the area obtained as the humidity information, and the duration information expressing the duration of staying in the area that includes the position of the vehicle, and the temperature of the brake device 18, to a learned model, and may use the output of the learned model as the results of estimating the deteriorated state of the brake fluid 48. In this case, by executing the brake state estimating program 300, the CPU 382 of the control device 380 of the managing server 16 carries out processing that is similar to the brake state estimating processing illustrated in above-described FIG. 9.

Further, the above describes, as an example, a case in which the control ECU 20 of the onboard devices 11 acquires, each predetermined time period, the air temperature detected by the temperature sensor 22, the vehicle speed detected by the vehicle speed sensor 24, the hydraulic pressure of the brake fluid 48 detected by the hydraulic pressure sensor 52 of the brake device 18, and the regeneration amount detected by the hybrid ECU 26, and transmits these information to the managing server 16 from the communication section 14. However, the present disclosure is not limited to this. The control ECU 20 of the onboard devices 11 may, on the basis of the air temperature detected by the temperature sensor 22, the vehicle speed detected by the vehicle speed sensor 24, the hydraulic pressure of the brake fluid 48 detected by the hydraulic pressure sensor 52 of the brake device 18, and the regeneration amount detected by the hybrid ECU 26, which were acquired each predetermined time period, compute the temperature of the brake disc, and transmit the results of computation from the communication section 14 to the managing server 16.
[Notes]

Although the above embodiments describe, as examples, cases of detecting the air temperature from the temperature sensor 22, the present disclosure is not limited to this. The air temperature of the area that includes the position of the vehicle 12 may be acquired from an external server.

Further, any of various types of processors other than a CPU may execute the various processings that are executed due to the CPU 20A, 382 reading software (a program) in the above-described embodiments. Examples of processors in this case include PLDs (Programmable Logic Devices) whose circuit structure can be changed after production such as FPGAs (Field-Programmable Gate Arrays) and the like, and dedicated electrical circuits that are processors having circuit structures that are designed for the sole purpose of executing specific processings such as ASICs (Application Specific Integrated Circuits) and the like, and the like. Further, the various processings may be executed by one of these various types of processors, or may be executed by a combination of two or more of the same type or different types of processors (e.g., plural FPGAs, or a combination of a CPU and an FPGA, or the like). Further, the hardware structures of these various types of processors are, more specifically, electrical circuits that combine circuit elements such as semiconductor elements and the like.

Further, the above-described respective embodiments describe forms in which the respective programs are stored in advance (are installed) on a computer-readable, non-transitory recording medium. For example, at the onboard devices 11, the brake state estimating program 100 is stored in advance in the storage 20D. Further, for example, at the managing server 316, the brake state estimating program 300 is stored in advance in the storage 385. However, the present disclosure is not limited to this, and the respective programs may be provided in a form of being recorded on a non-transitory recording medium such as a CD-ROM (Compact Disc Read Only Memory), a DVD-ROM (Digital Versatile Disc Read Only Memory), a USB (Universal Serial Bus) memory, or the like. Further, the respective programs may in a form of being downloaded from an external device over a network.

The flows of the processings described in the above embodiments also are examples, and unnecessary steps may be deleted therefrom, new steps may be added thereto, or the order of processings may be rearranged, within a scope that does not depart from the gist of the present disclosure.

In addition, the respective structures of the onboard devices and the managing server described in the above embodiments are examples, and may be changed in accordance with the situation within a scope that does not depart from the gist of the present disclosure.

What is claimed is:

1. A brake state estimation device, comprising:
a memory; and
a processor coupled to the memory, wherein the processor is configured to:
acquire a position of a subject vehicle, the position including latitude and longitude of a current position of the subject vehicle;
acquire duration information expressing a duration of stay in an area that includes the position of the subject vehicle;
transmit, to a managing server, the position of the subject vehicle;
acquire, from the managing server, humidity information corresponding to the position of the subject vehicle;
estimate a state of deterioration of brake fluid for operating a hydraulic brake device of the subject vehicle, on the basis of the humidity information corresponding to the position of the subject vehicle and the duration information; and
display the state of deterioration on a display in levels of four stages to warn a user of the state of deterioration;
wherein the humidity information is a factor expressing a relationship between the duration of stay in the area and an amount of moisture contained in the brake fluid, the factor being determined in advance for the area that includes the position of the subject vehicle.

2. The brake state estimation device of claim 1, wherein:
the processor is configured to further acquire a temperature of the brake device, and
the processor estimates the state of deterioration of the brake fluid on the basis of the temperature of the brake device, the humidity information, and the duration information.

3. The brake state estimation device of claim 2, wherein the processor:
estimates a heat state of the brake fluid on the basis of the temperature of the brake device; and
estimates the state of deterioration of the brake fluid on the basis of the heat state.

4. The brake state estimation device of claim 2, wherein the processor estimates the state of deterioration by using a learned model for estimating the state of deterioration of the brake fluid on the basis of the temperature of the brake device, the humidity information and the duration information.

5. A vehicle, comprising:
the brake state estimation device of claim 1; and
a hydraulic brake device.

6. A brake state estimation method, performed by a computer device, comprising:
acquiring a position of a subject vehicle, the position including latitude and longitude of a current position of the subject vehicle;
acquiring duration information expressing a duration of stay in an area that includes the position of the subject vehicle;
transmitting, to a managing server, the position of the subject vehicle;
acquiring, from the managing server, humidity information corresponding to the position of the subject vehicle;
estimating a state of deterioration of brake fluid for operating a hydraulic brake device of the subject vehicle, on the basis of the humidity information corresponding to the position of the subject vehicle, and of the duration information; and
displaying the state of deterioration on a display in levels of four stages to warn a user of the state of deterioration;
wherein the humidity information is a factor expressing a relationship between the duration of stay in the area and an amount of moisture contained in the brake fluid, the factor being determined in advance for the area that includes the position of the subject vehicle.

7. A non-transitory recording medium storing a program executable by a computer to perform processing, the processing comprising:
acquiring a position of a subject vehicle, the position including latitude and longitude of a current position of the subject vehicle; and
acquiring duration information expressing a duration of stay in an area that includes the position of the subject vehicle;
transmitting, to a managing server, the position of the subject vehicle;

acquiring, from the managing server, humidity information corresponding to the position of the subject vehicle; and estimating a state of deterioration of brake fluid for operating a hydraulic brake device of the subject vehicle, on the basis of the humidity information corresponding to the position of the subject vehicle, and the duration information; and displaying the state of deterioration on a display in levels of four stages to warn a user of the state of deterioration;

wherein the humidity information is a factor expressing a relationship between the duration of stay in the area and an amount of moisture contained in the brake fluid, the factor being determined in advance for the area that includes the position of the subject vehicle.

* * * * *